(12) United States Patent
Chang et al.

(10) Patent No.: US 9,225,137 B2
(45) Date of Patent: Dec. 29, 2015

(54) APPARATUS AND METHODS FOR CONTROLLING CARRIER ENVELOPE PHASE OF LOW REPETITION RATE PULSES

(71) Applicant: University of Central Florida Research Foundation Inc., Orlando, FL (US)

(72) Inventors: Zenghu Chang, Oviedo, FL (US); Yi Wu, Orlando, FL (US); Eric Cunningham, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 14/583,904

(22) Filed: Dec. 29, 2014

(65) Prior Publication Data
US 2015/0188275 A1    Jul. 2, 2015

Related U.S. Application Data

(60) Provisional application No. 61/922,402, filed on Dec. 31, 2013, provisional application No. 62/096,579, filed on Dec. 24, 2014.

(51) Int. Cl.
*H01S 3/13* (2006.01)
*H01S 3/23* (2006.01)
*H01S 3/00* (2006.01)

(52) U.S. Cl.
CPC ............. *H01S 3/0057* (2013.01); *H01S 3/1307* (2013.01); *H01S 3/0085* (2013.01); *H01S 3/2316* (2013.01)

(58) Field of Classification Search
CPC ... H01S 3/0057; H01S 3/1307; H01S 3/0085; H01S 3/2316
See application file for complete search history.

(56) References Cited

U.S. PATENT DOCUMENTS

| 8,073,026 B2 | 12/2011 | Chang et al. | |
| 2007/0217542 A1* | 9/2007 | Kaertner | G01J 11/00 375/295 |
| 2009/0135859 A1* | 5/2009 | Yu | H01S 3/1109 372/18 |

(Continued)

FOREIGN PATENT DOCUMENTS

EP    2 033 279 B1    8/2011

OTHER PUBLICATIONS

Schatzel et al., "Long-term stabilization of the carrier-envelope phase of few-cycle laser pulses", Applied Physics B, vol. 79, pp. 1021-1025 (2004).*

(Continued)

*Primary Examiner* — Eric Bolda
(74) *Attorney, Agent, or Firm* — William Greener; Bond, Schoeneck & King, PLLC (57) ABSTRACT

The carrier-envelope phase (CEP) of a laser pulse has been shown to influence many physical processes such as pulse propagation through polar molecules, cross-phase modulation, ponderomotive surface-plasmon electron acceleration, photoemission from metallic surfaces, terahertz emission from the laser breakdown of air, above-threshold ionization, high harmonic generation, and attosecond pulse generation. Current technology does not allow for the CEP stabilization of chirped pulse amplification (CPA) systems operating at a repetition rate much lower than a kHz. The inventors disclose apparatus and methods that enable CEP control in CPA systems operating at arbitrarily-low repetition rates.

2 Claims, 12 Drawing Sheets

Locking 10 Hz CEP with 10% beam
(one control loop):
Use high-repetition rate "CEP probe"

Even though the compressed output
operates at a low repetition rate,
feedback is fast enough to lock CEP!

(56) References Cited

U.S. PATENT DOCUMENTS

2010/0040097 A1* 2/2010 Verhoef ............... H01S 3/0057
372/25
2013/0156055 A1* 6/2013 Biegert .................... G02F 1/39
372/25

OTHER PUBLICATIONS

Advances in carrier-envelope phase stabilization of grating-based chirped-pulse amplifiers, Moon et al., pp. 160-177, Laser & Photon. Rev. 4, No. 1 (2010).

* cited by examiner

High Harmonic Generation/
Attosecond Pulse Generation:
processes depend on
instantaneous electric field,
not the time-averaged
intensity envelope May not seem like a big difference...

FIG. 1A

High Harmonic Generation/
Attosecond Pulse Generation:
processes depend on
instantaneous electric field,
not the time-averaged
intensity envelope ... but look at an extreme example

Dump bucket analogy

- Fun maximized when:
  1. Water temperature is just right
  2. Largest possible volume is dumped

- Wildly-fluctuating hot and cold pipes fill the bucket

- Regulate the temperature by adjusting the ratio

- Only know what correction to make once the bucket is dumped and the temperature is checked

- If waiting too long between measurements, the source temperature changes in unknown ways

- Therefore, temperature can be stabilized only if the bucket is dumped out frequently

- This limits the amount of water that can accumulate in between

FIG. 4A

Dump bucket analogy

- Fun maximized when:
  1. Water temperature is just right
  2. Largest possible volume is dumped

- Instead of dumping out *all* the water on a frequent basis, spill only enough water to gauge temperature

- Continue to stabilize the temperature just as before by adjusting the ratio after feeling the water

- Leaving water in the bucket allows the volume to build up over time

- This removes the limitation on the amount of water that can be dumped while the temperature is fixed

- Amount of fun is now maximized in both cases

FIG. 4B

APPARATUS AND METHODS FOR CONTROLLING CARRIER ENVELOPE PHASE OF LOW REPETITION RATE PULSES

CROSS-REFERENCE TO RELATED APPLICATION

This application derives priority from United States provisional patent application Ser. No. 61/922,402, filed 31 Dec. 2013 and United States provisional patent application Ser. No. 62/096,579, filed 24 Dec. 2014 titled Apparatus and Methods for Controlling Carrier Envelope Phase of Low Repetition Rate Pulses, the contents of each of which is incorporated herein fully be reference.

FEDERAL GOVERNMENT SUPPORT

NSF Award #1068604; ARO agreement #W911NF-12-1-0456; DARPA contract #W31P4Q1310017. The U.S. government has certain rights in this invention.

BACKGROUND

In the field of high-intensity ultrafast laser science, there are certain processes such as, e.g., high harmonic generation and isolated attosecond pulse production that do not rely on the time-averaged intensity of the femtosecond laser pulse, but rather on the instantaneous amplitude of the underlying electric field oscillations themselves. In order to describe this sub-cycle dependence adequately, alternative concepts must be introduced.

SUMMARY

One such alternative concept is the concept of carrier-envelope phase. The concept of carrier-envelope phase (CEP) of a laser pulse is defined as the phase difference between the temporal peak of the pulse's Gaussian envelope and the maximum instantaneous value of its underlying carrier electric field. For example, a pulse with CEP=0 is one in which the maximum of the Gaussian envelope and the maximum value of the electric field coincide in time (i.e., the carrier wave looks like a cosine function); alternatively, a pulse with CEP=$\pi/2$ is one in which the electric field is zero at the time when the Gaussian envelope is maximum (i.e., the carrier wave looks like a sine function). Mathematically, this time-dependent instantaneous electric field can be expressed as $E(t)=\text{Exp}[-(t/\tau p)^2]\cos[\omega t+\phi CE]$, where $\tau p$ is the temporal duration of the Gaussian envelope, $\omega$ is the carrier frequency of the laser pulse, and $\phi CE$ is the carrier-envelope phase.

In a typical Ti:sapphire oscillator and chirped-pulse amplifier (CPA) there is nothing that naturally constrains the pulses to have consistent CEP values from shot to shot. In fact, pump energy fluctuations, thermal variations, pointing instabilities, air currents, and mechanical vibrations (especially in the CPA stretcher and compressor, where the spectral components are spatially dispersed) can all cause the CEP to change over time. Numerous ways of stabilizing these CEP fluctuations in both the oscillator and the CPA using feedback or feed-forward control loops have been devised over the past decade. Such stabilization techniques rely on 1) measuring the latest CEP of a pulse (or average CEP of a group of pulses), 2) comparing the value to a set point (or, in a feed-forward configuration, inserting the value into the mathematical model), and 3) providing corrective action to reduce the CEP drift.

In the case of a Ti:sapphire oscillator, CEP correction can be applied essentially as quickly as the electronics can respond because the laser's repetition rate is typically tens of megahertz. In the case of a CPA, however, CEP correction can be applied only as often as a new pulse arrives with the latest CEP error information. This means that any CEP jitter occurring at frequencies near to or higher than the laser's repetition rate cannot be compensated. As a result, CEP-locked CPA systems are all but limited to repetition rates of one kilohertz (kHz) or higher.

As a side note: the underlying reason for this 1 kHz barrier essentially comes down to limitations on pumping technology for the CPA amplifiers. For example, a Ti:sapphire gain medium is most commonly pumped by lasers that are frequency doubled to operate in the green: Nd:YLF (527 nm), Nd:YAG (532 nm), Nd:glass, etc. Each of these lasers has its own limitations (due to thermal conductivity, pumping mechanism, etc.) that confine its parameters of operation (like pulse energy, repetition rate, etc.) to certain ranges. For example: Nd:YLF lasers operate at repetition rates between 1 kHz and 10 kHz, while Nd:YAG lasers operate at repetition rates between 1 Hz and 100 Hz (most commonly at 10 Hz). Thinking of CEP, the stabilization electronics rely on consistent feedback concerning the variation of the phase, and the drop-off between receiving new information every 1 ms (1 kHz repetition rate) and receiving information every 100 ms (10 Hz repetition rate) is debilitating. (Thinking of the frequency domain: one would expect to be able to compensate for roughly 100 times fewer frequencies of phase noise when operating at 10 Hz vs. 1 kHz because of the slower sampling rate). Additionally, Nd:YLF lasers tend to be diode-pumped (leading to good pulse-to-pulse stability but at limited energy), while Nd:YAG lasers are typically flash lamp-pumped (allowing for much higher pulse energy but with more shot-to-shot variability). Because CEP (especially the measurement of CEP) is dependent upon the parameters of the pulse, the shot-to-shot variability of the Nd:YAG laser muddles the retrievable phase information used for stabilization, making it much harder to lock the CEP. Thus, the CEP can be locked in a Ti:sapphire-based CPA when pumped by Nd:YLF lasers (which can operate down to 1 kHz repetition rates). The CEP is extremely difficult to lock below 1 kHz because the next fastest available pump source (Nd:YAG) operates at only 1-100 Hz (limits the noise that can be compensated by the feedback electronics) and tends to have higher pulse-to-pulse variability (due to flash lamp pumping instead of diode pumping).

Typical kilohertz CPA systems are themselves limited to pulse energies on the order of millijoules. This in turn restricts the laser's usefulness for studying and controlling strong-field phenomena. If this laser system is used to generate isolated attosecond pulses, for example, this energy ceiling confines the achievable attosecond pulse energy to tens of nanojoules—not enough for performing attosecond pump—attosecond probe experiments or examining nonlinear XUV dynamics. In order to achieve higher laser intensities and to generate microjoule-level attosecond pulse energies, laser systems must be used that can output joule-level laser pulses. However, such CPA systems only operate at repetition rates typically 10 Hz or lower, which are too low to be CEP stabilized using current technology.

In view of the aforementioned (and otherwise appreciated) shortcomings in the current technology, the inventors have recognized the benefits and advantages available from apparatus and methods making these high-energy systems more suitable for high-field experiments and attosecond pulse production. More specifically, solutions to outstanding problems and shortcomings in the field of the invention, and benefits and advantages resulting therefrom, will be enabled by embodied apparatus and methods for controlling carrier envelope phase of low repetition rate pulses (e.g., 100 Hz to <1 Hz) from CPA systems (both single and double).

A CPA system in accordance with the embodiments includes a pulse stretcher that provides stretched optical pulses from a CEP-stabilized oscillator. The CPA system also includes a high repetition rate seed amplifier disposed to receive the stretched optical pulses from the pulse stretcher, which provides a high repetition rate seed beam output. The CPA system also includes a low repetition rate amplifier disposed to directly receive the high repetition rate seed beam output and provide a low repetition rate output beam. The CPA system also includes a pulse compressor disposed to receive the low repetition rate output beam. The CPA system also includes a high repetition rate seed beam sampling component optically coupled with the high repetition rate seed amplifier for selecting a portion of the high repetition rate seed beam output as a sample beam. The CPA system also includes a sample beam optical assembly optically coupled with the high repetition rate seed beam sampling component disposed in a manner to route the sample beam around the low repetition rate amplifier and into the pulse compressor, wherein the sample beam output from the pulse compressor is encoded with CEP errors. The CPA system also includes a measurement device disposed to receive the encoded sample beam output from the pulse compressor. The CPA system also includes a sample beam correction control loop that receives a measurement signal from the measurement device coupled to a CEP stabilization module.

A method for controlling carrier envelope phase (CEP) of low repetition rate pulses in a CPA system in accordance with the embodiments includes providing a CEP-stabilized seed beam. The method also includes propagating the CEP-stabilized seed beam through a pulse stretcher. The method also includes propagating the stretched seed beam through a high repetition rate amplifier. The method also includes propagating the amplified, stretched, high repetition rate beam through a low repetition rate amplifier. The method also includes propagating the amplified, stretched, high repetition rate beam output from the low repetition rate amplifier through a pulse compressor. The method also includes obtaining a sample beam by sampling a portion of the amplified, stretched, high repetition rate beam prior to propagating the amplified, stretched, high repetition rate beam through the low repetition rate amplifier. The method also includes bypassing the low repetition rate amplifier with the sample beam. The method also includes propagating the sample beam through the pulse compressor. The method also includes measuring the compressed sample beam. The method also includes using a parameter of the measured sample beam to stabilize the CEP.

BRIEF DESCRIPTION OF THE DRAWINGS

The objects, features and advantages of the embodiments are understood within the context of the Detailed Description of the Non-Limiting Embodiments as set forth below. The Detailed Description of the Non-Limiting Embodiments is understood within the context of the accompanying drawings that form a material part of this disclosure, wherein.

DETAILED DESCRIPTION OF THE
NON-LIMITING EMBODIMENTS

FIG. 1A, FIG. 1B, FIG. 2A, FIG. 2B, FIG. 3A and FIG. 3C are included as background information that is intended as useful for interpreting and understanding the remaining drawing figures and the embodiments.

A typical CEP-locked CPA system can be summarized as follows: a CEP-locked oscillator seed is stretched, amplified at a high repetition rate, and compressed. At the output, a minor fraction of the beam is taken to measure its CEP value. [This fraction may be 1%, 2%, 3% ... 10% ... 15%, or more as will be understood by a skilled person, as it is the final amount of energy in the sample beam that is important, not the percentage of energy taken for the sample. For example: if the CEP is measured using f-to-2f interferometry, the required input sample energy is usually tens of microjoules or more. Depending on the loss introduced in the second CPA's stretcher and compressor, the sample energy might need to be higher (to compensate for high losses) or lower (good efficiency leaves the energy largely intact). The sample percentage further depends on the energy of the original beam seeding the second CPA from which the sample is taken.]. Assuming (for now) the CEP jitter is corrected using feedback to the stretcher grating, this value is compared to a set point, and then the error signal is used as input for a feedback algorithm such as a PID ('proportional-integral-derivative') controller (see, e.g., http://en.wikipedia.org/wikiiPIDcontroller). The corrective output is sent as a voltage to a piezoelectric actuator integrated into the stretcher grating mount, and the resulting change in position of the grating corrects the CEP. The CEP correction can also be done with other devices such as acousto-optical or electro-optical modulators.

Figure 1A:
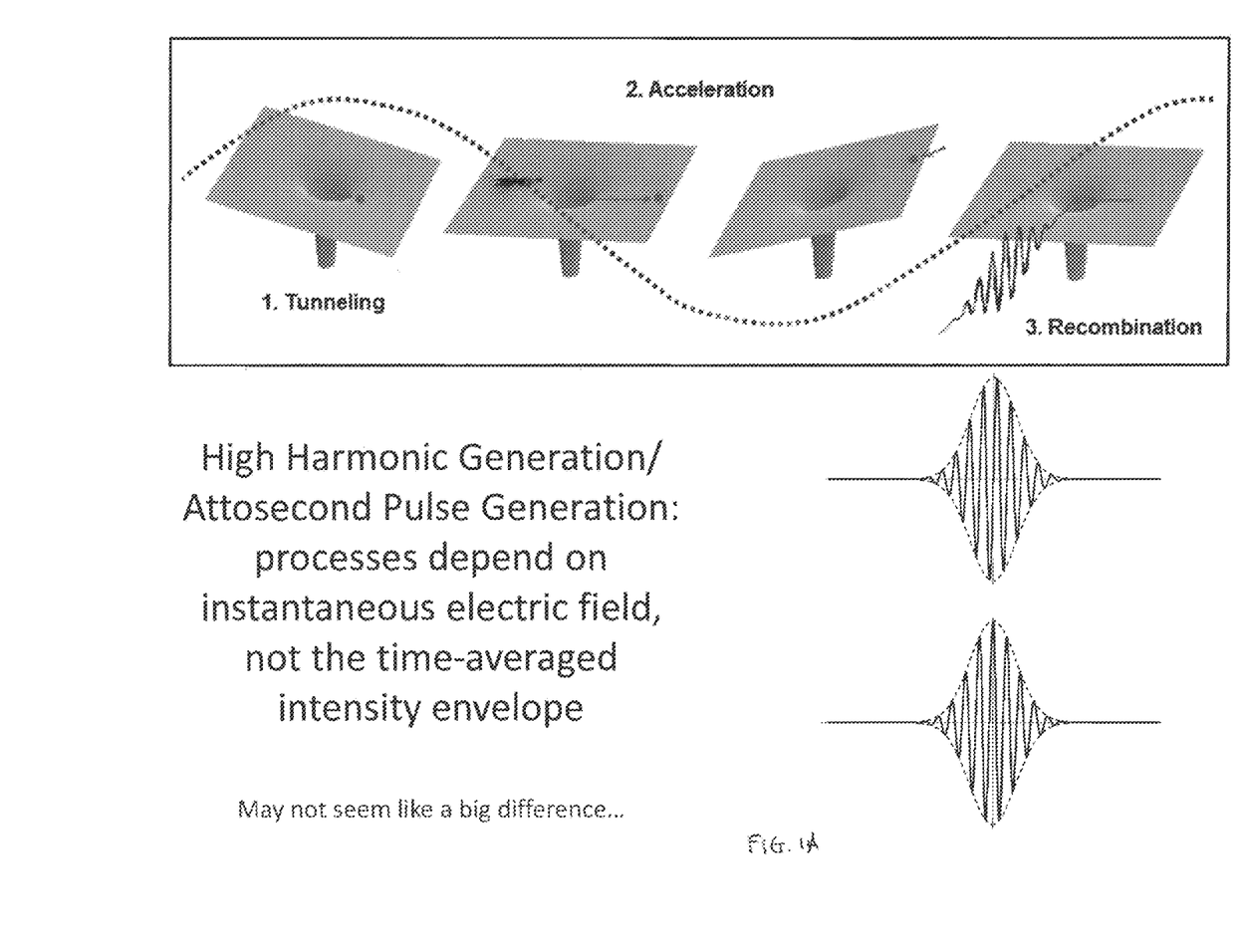
FIG. 1A and FIG. 1B show, respectively, non-limiting case and limiting case for high harmonic generation attosecond pulse generation in accordance with the embodiments.
Figure 1B:
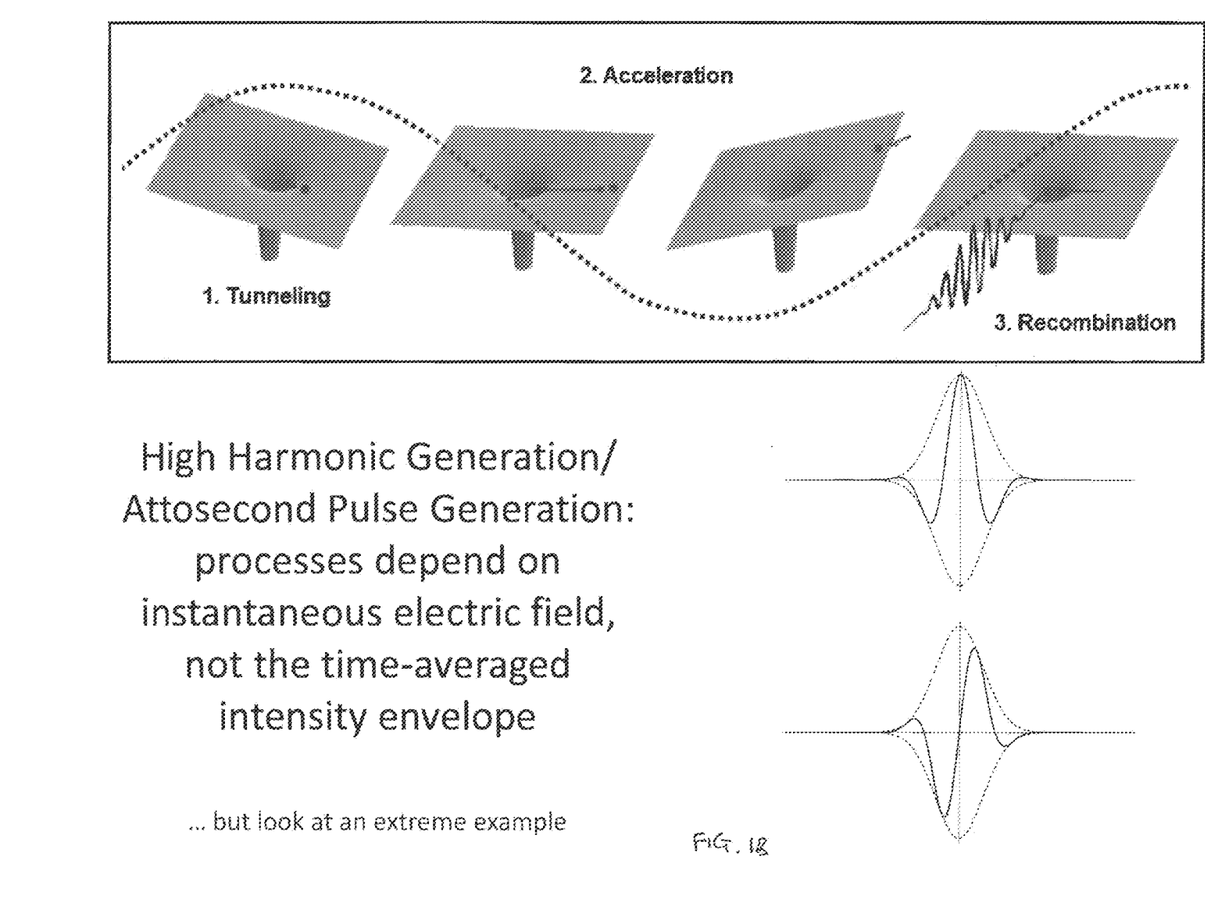
Figure 2A:
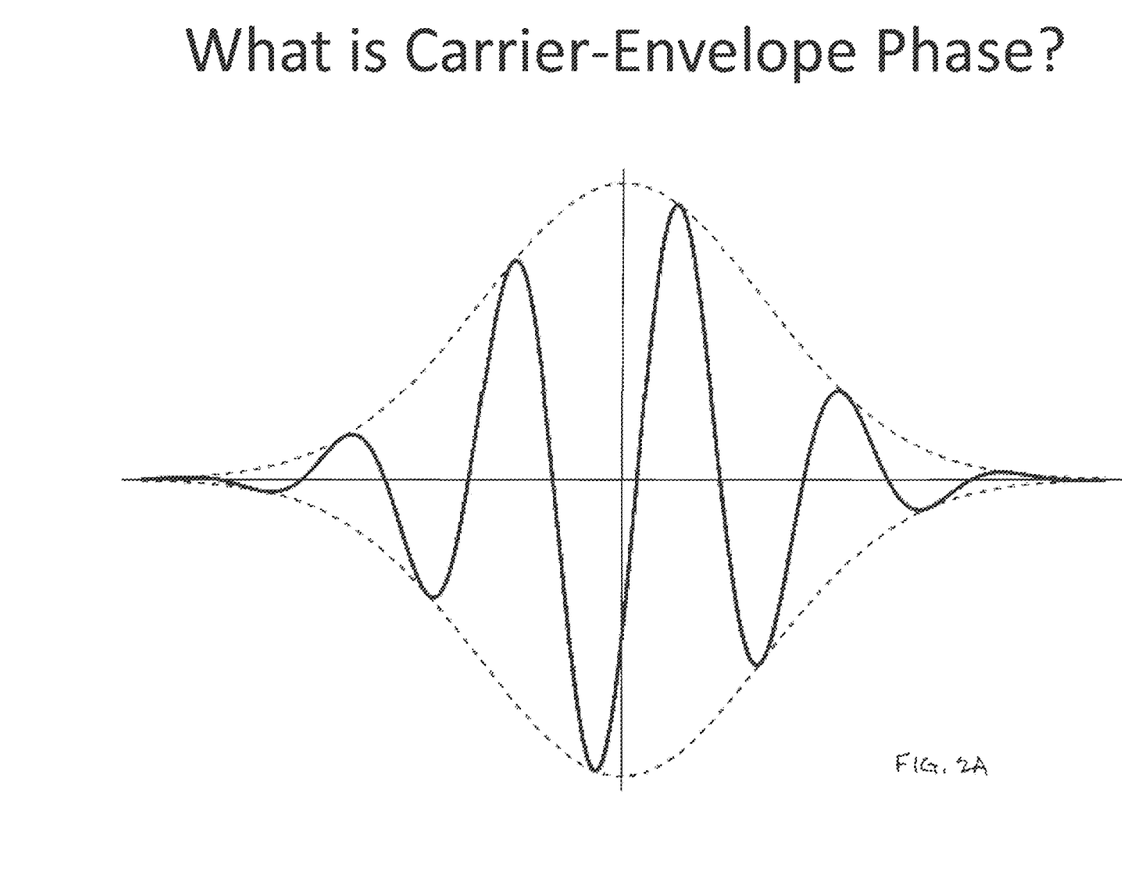
FIG. 2A, FIG. 2B and FIG. 2C show graphical and mathematical aspects of carrier envelope phase in accordance with the embodiments.
Figure 2B:
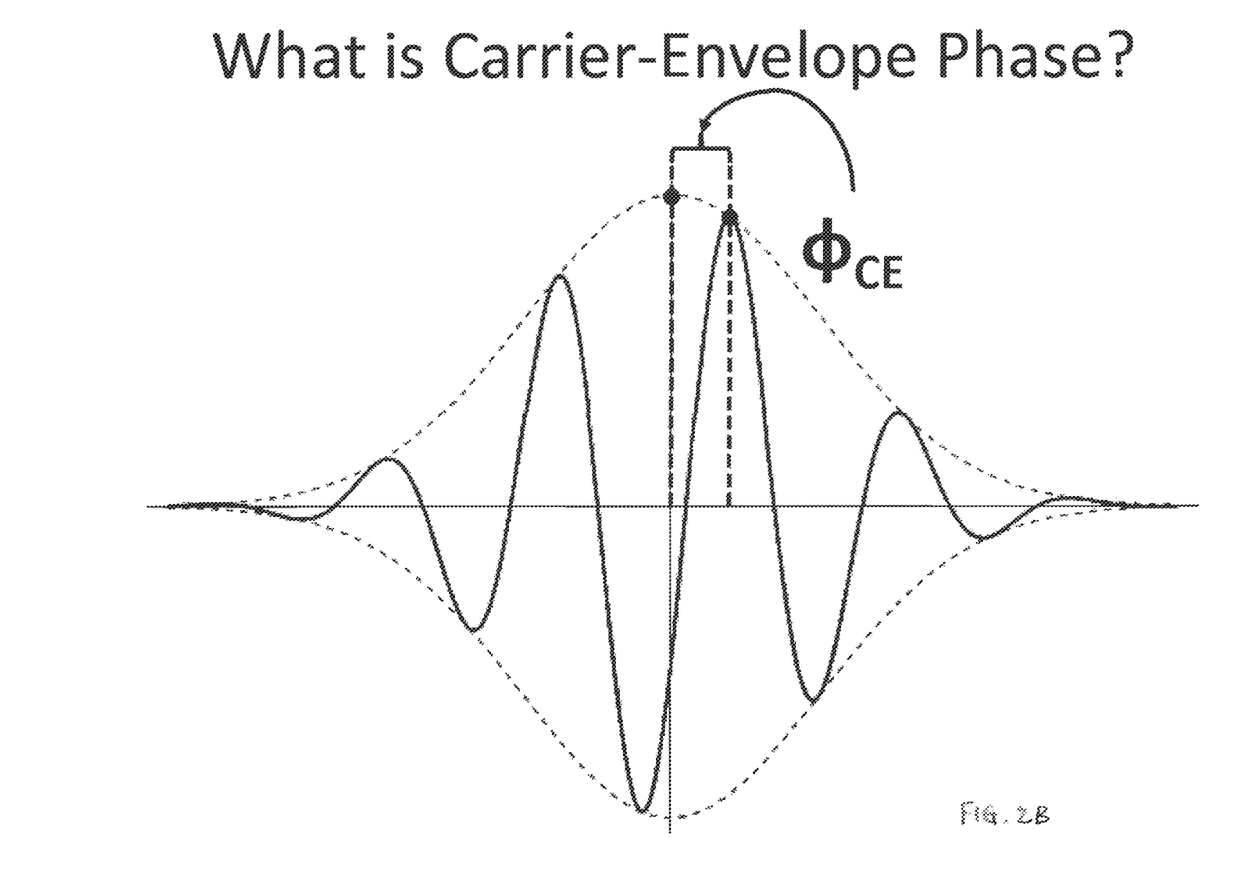
Figure 2C:
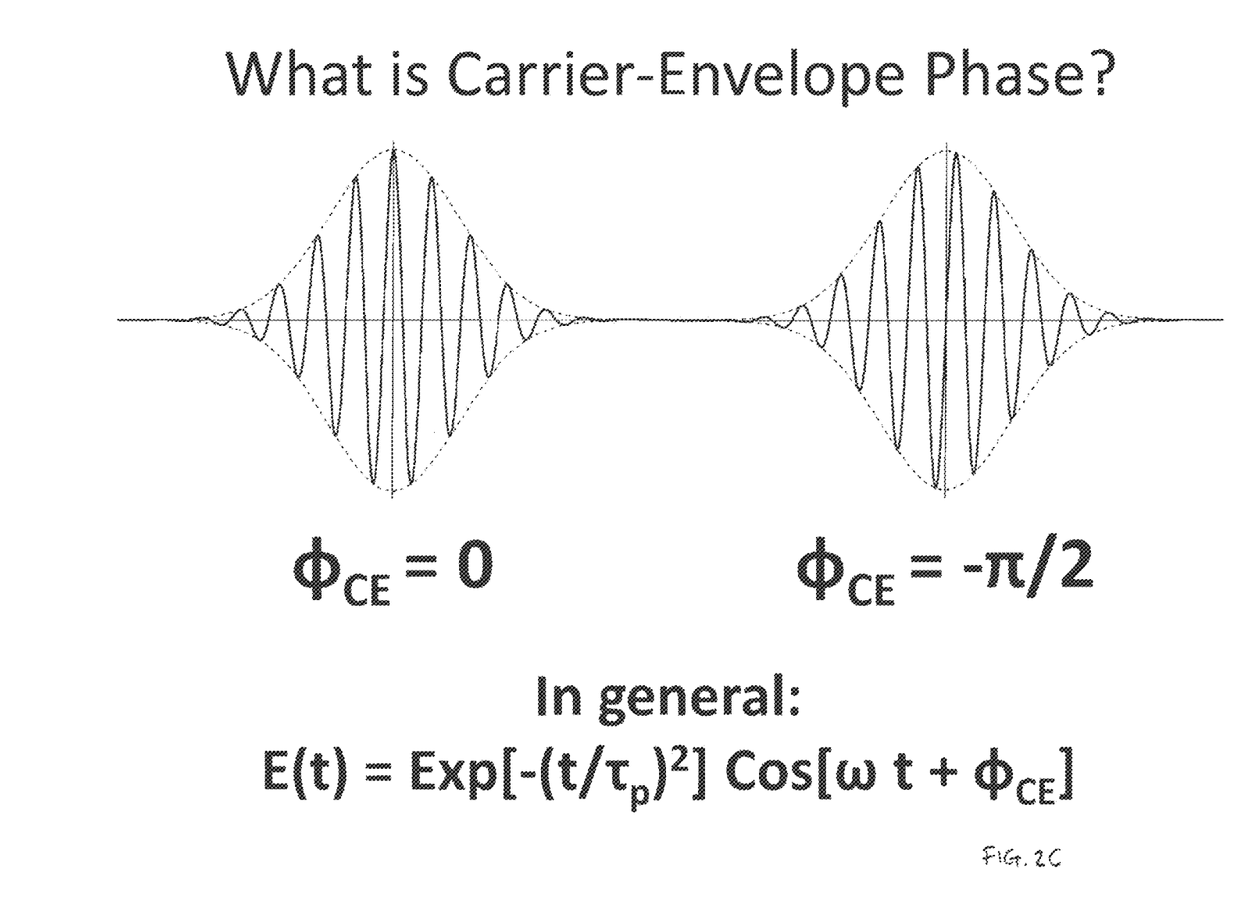
Figure 3A:
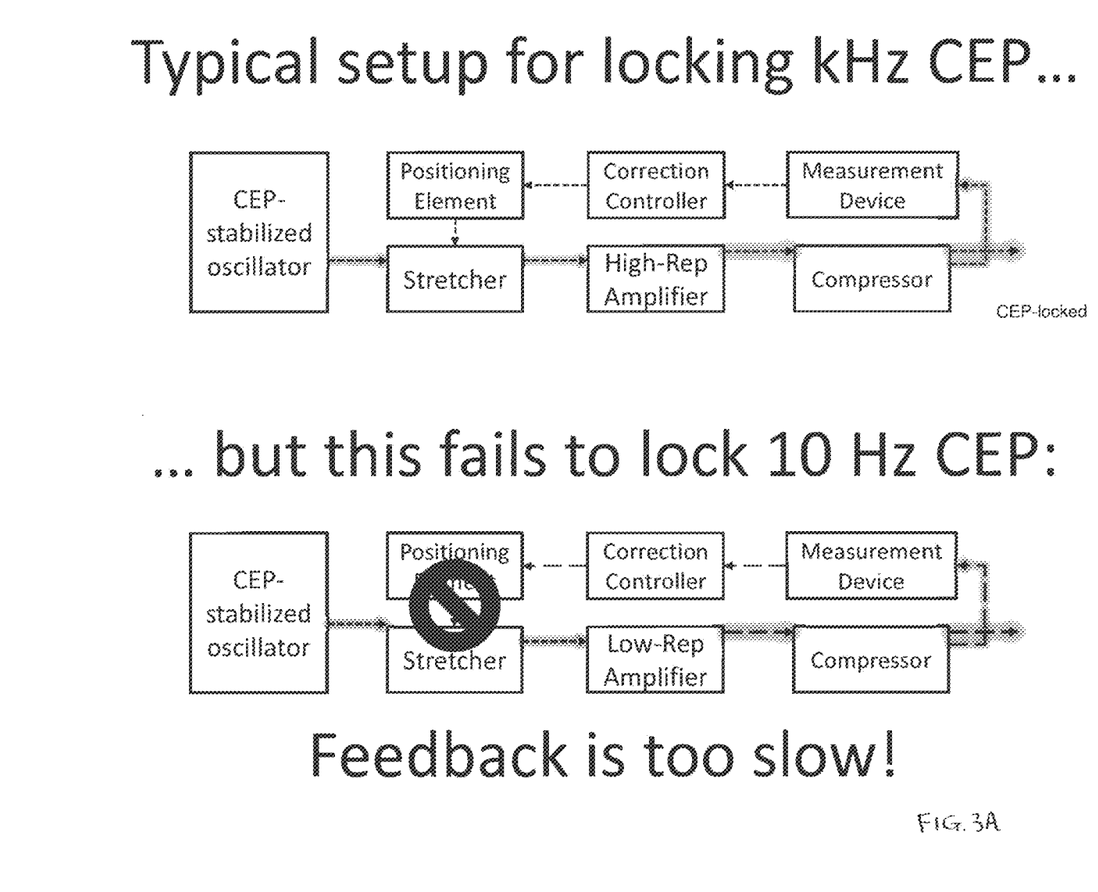
FIG. 3A, FIG. 3B, FIG. 3C, FIG. 3D and FIG. 3E show various aspects of locking 10 Hz CEP in accordance with the embodiments.
Figure 3B:
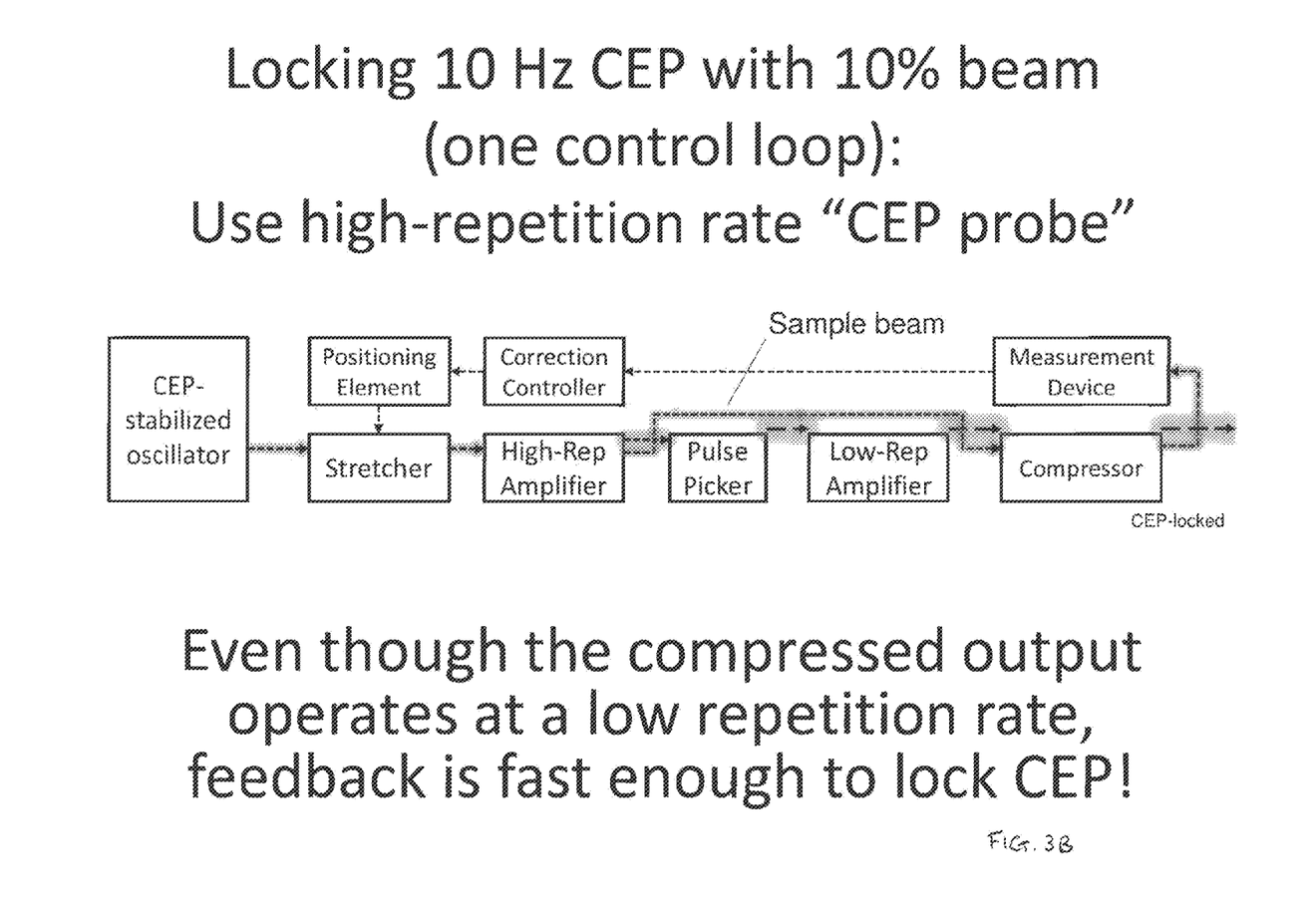

For a low repetition-rate amplifier (e.g., 10 Hz, but 'low repetition rate' is intended to mean from about 100 Hz to less than 1 Hz) seeded directly by a high repetition-rate amplifier, the beam is sampled directly (e.g., 10% sample beam) after the high repetition-rate amplifier rather than after the compressor (as performed in the previous paragraph). This high-repetition-rate, 10% beam bypasses the low repetition-rate amplifier, which is permissible because most CEP drift arises from mechanical vibrations in the stretcher and compressor, not in the amplifier, and then passes through the same compressor used by the low repetition-rate amplified pulses. By doing so, all additional CEP errors arising from mechanical vibrations in the compressor are encoded in the (10%) sample beam. Thus when the CEP of the 10% sample beam is measured and the control loop signal is established, the feedback is made using information describing the same set of conditions encountered by the low repetition-rate laser. This effectively locks the low repetition-rate CEP just as well as the high repetition-rate CEP. As illustrated in FIG. 3B, the 10% sample beam bypasses the low repetition-rate amplifier in order to 1) prevent loss of the 10% sample beam signal by absorption, 2) avoid altering the conditions of the low repetition-rate amplifier, and 3) sidestep the impossibility of aligning the non-collinear 10% sample beam through all the passes and minors of the amplification stage. By skipping all passes through the low repetition-rate gain medium, the 10% sample beam experiences less dispersion as compared to the low repetition-rate amplified pulse. This dispersion must be compensated so that the 10% pulse can be compressed by the same grating configuration used to compress the low repetition-rate amplified pulse; otherwise, the 10% pulse will become negatively dispersed, and its peak intensity may be too weak for the CEP measurement setup. (One solution is to direct the 10% beam through a bulk dispersive material (such as glass) prior to entering the compressor).

Figure 3C:
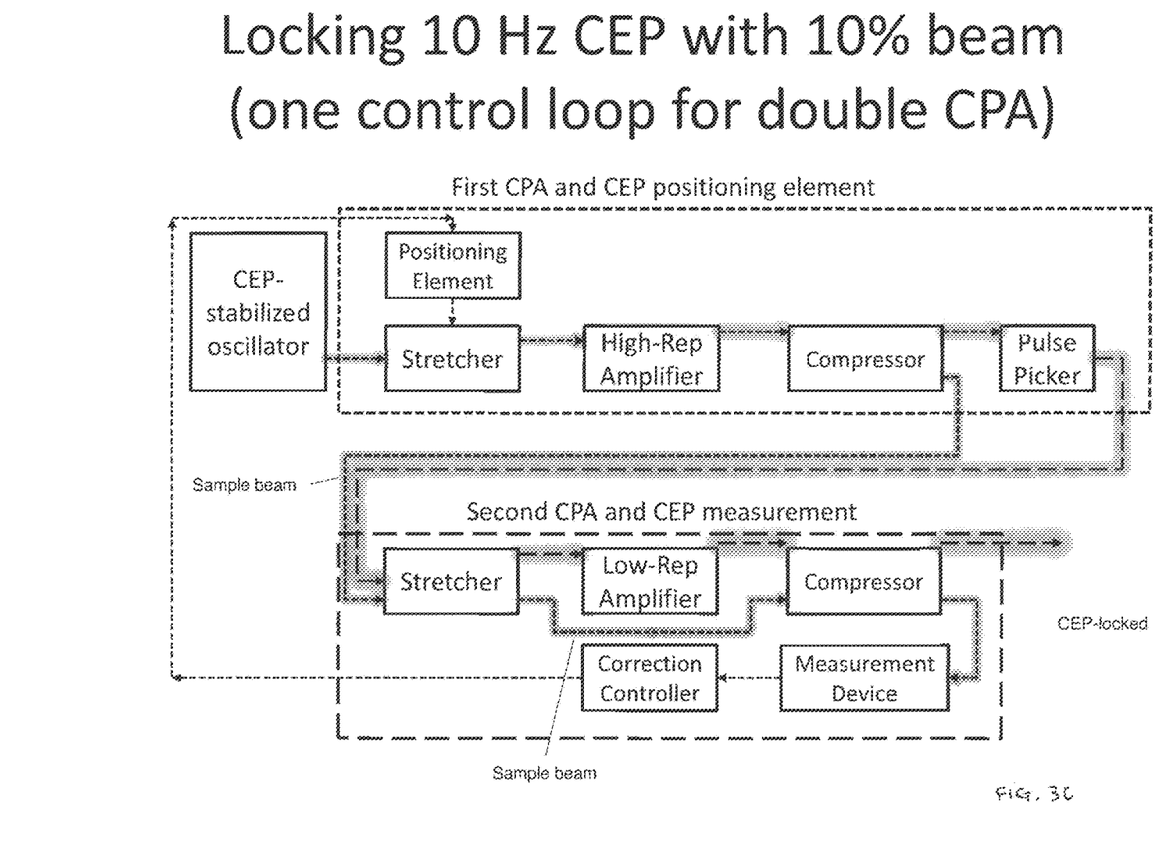

Referring to FIG. 3C, for a double CPA system in which the front-end CPA operates at a high repetition rate and the back-end CPA operates at a low repetition rate, the 10% sample of the beam is still taken after the compressor. Instead of sending this pulse to the CEP measurement setup, however, the beam is directed through both the low repetition-rate stretcher and the low repetition-rate compressor (the low repetition-rate amplifier is bypassed for the same reasons mentioned above, and the need for additional dispersion compensation for the 10% beam still remains). With the CEP jitter of both stretchers and both compressors imprinted on the beam, its CEP value can be measured, and the stretcher grating position in the front-end CPA can be used to stabilize the CEP of the entire system.

Figure 3D:
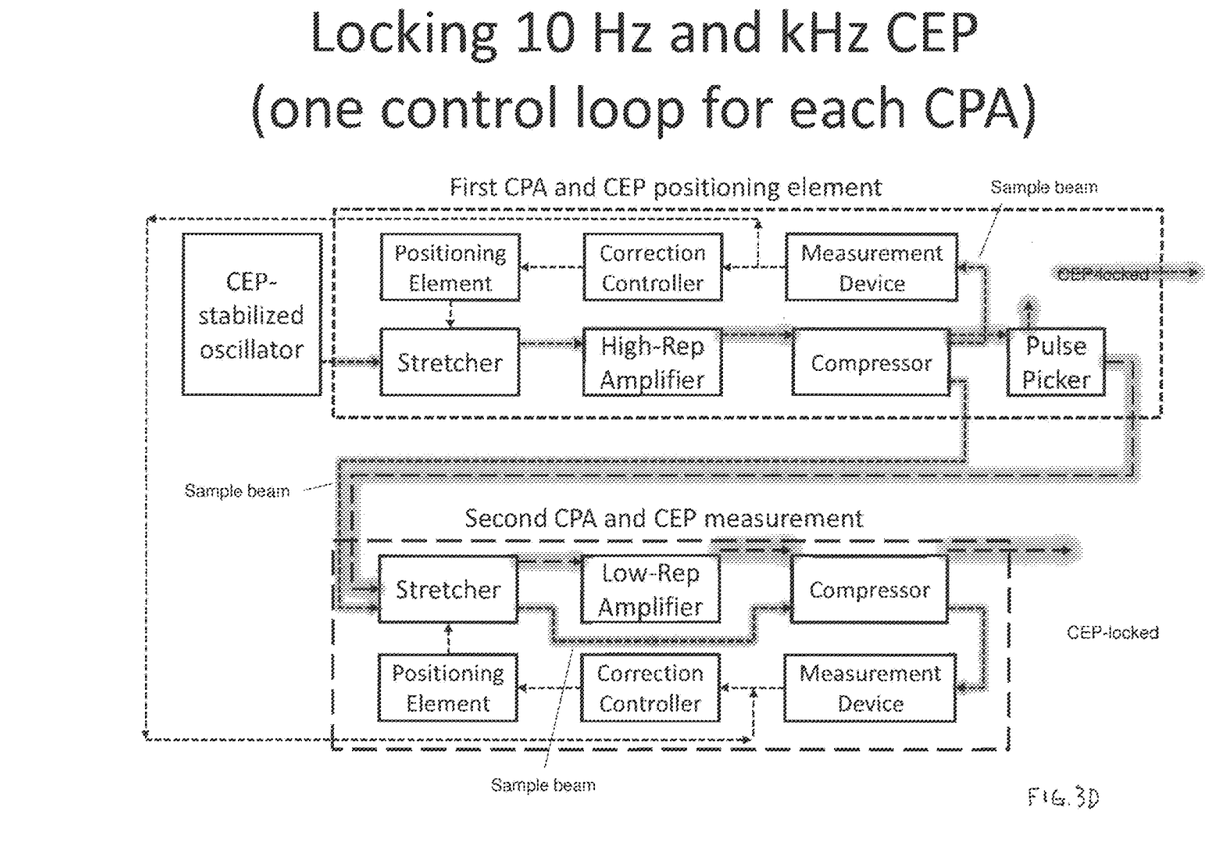

This method may not ensure that the output of the front-end CPA is locked, but only the final system output. If both CPA systems were to be CEP-stabilized with its own control loop (FIG. 3D), the original 10% beam would need to be split in two: one part would be measured immediately for locking the CEP of the front-end CPA, and the other part would be used as the CEP probe for the back-end CPA. The CEP measurement made after the back-end CPA, however, contains the total CEP noise of both CPA systems; therefore, the front-end CEP measurement must be subtracted from the back-end CEP measurement in order to isolate the CEP noise occurring in the back-end CPA only. This new CEP value, representing only the noise accrued in the back-end CPA, would be used to determine the feedback applied to the stretcher grating in the back-end CPA. To summarize, the front-end CEP measurement is used to stabilize the front-end CEP, while the back-end CEP measurement minus the front-end CEP measurement is used to stabilize the back-end CEP. In this way, a pulse picker (such as a Pockels cell or an optical chopper, for example) in a proper configuration could be employed to allow a usable, CEP-stabilized output from each CPA system.

Figure 3E:
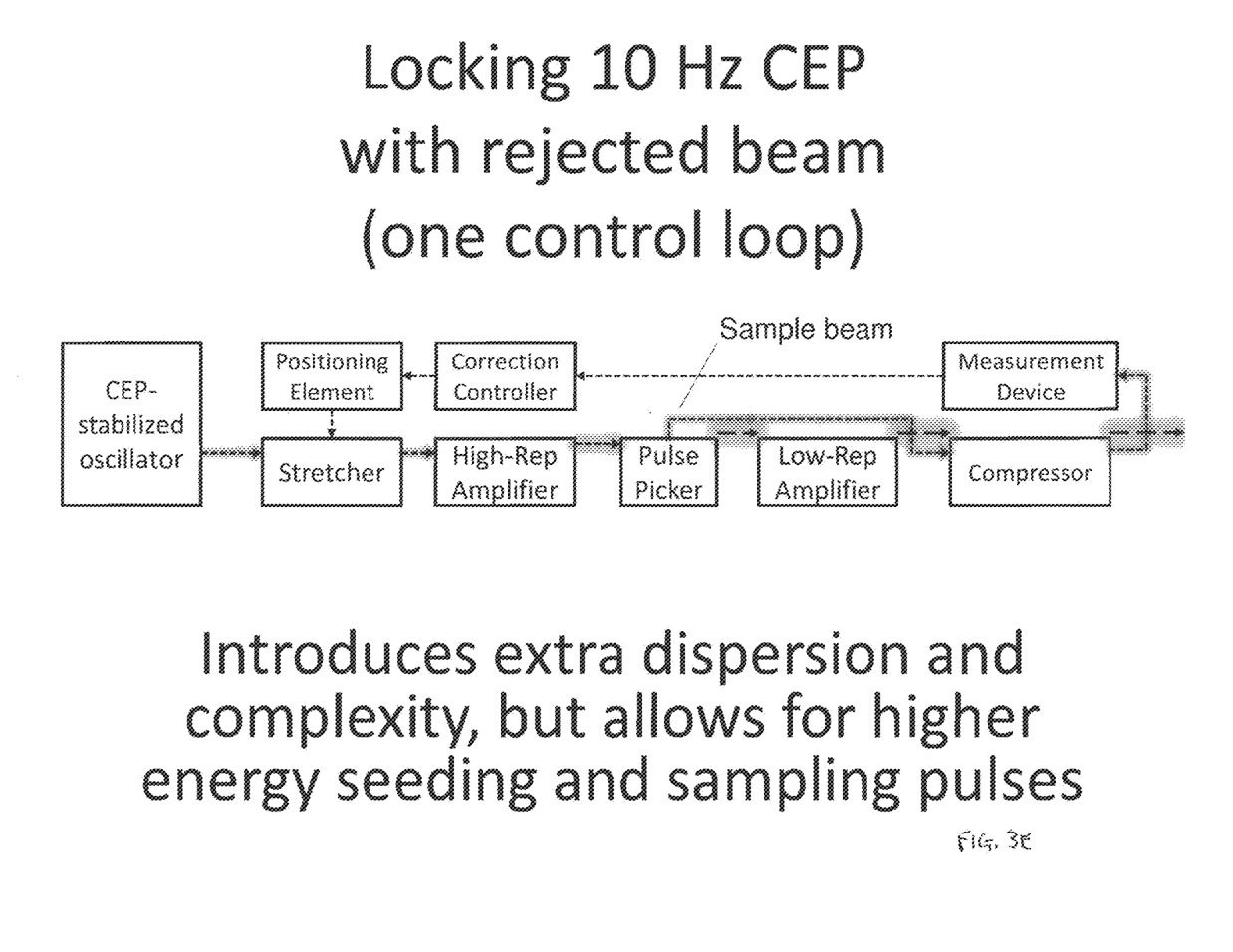

In the case mentioned above using a Pockels cell pulse picker, the beam passed by the pulse picker could be used as the seed for the low-repetition back-end CPA, while the pulses rejected by the pulse picker turn into the output of the high-repetition front-end CPA. This same configuration might also be applied to a single CPA system (FIG. 3E): instead of using the rejected pulses as another output of the laser, they can be used as the sampling beam for locking the CEP of the low-repetition CPA (rather than, e.g., sampling with a beam splitter). Because the low repetition rate is substantially smaller than the high repetition rate, only a small fraction of the pulses are missing from the high-rep pulse train, meaning it is still capable of locking the CEP. While this method may add to the cost, complexity, and dispersion of the system, it does offer two main advantages: 1) it allows the low-repetition amplifier to be seeded with the highest energy possible since no energy is sacrificed to the sampling beam and 2) the available energy in the sampling beam is no longer limited to a fraction of the high-repetition beam energy, but rather the full energy is available for the measurement process.

Figure 4A:
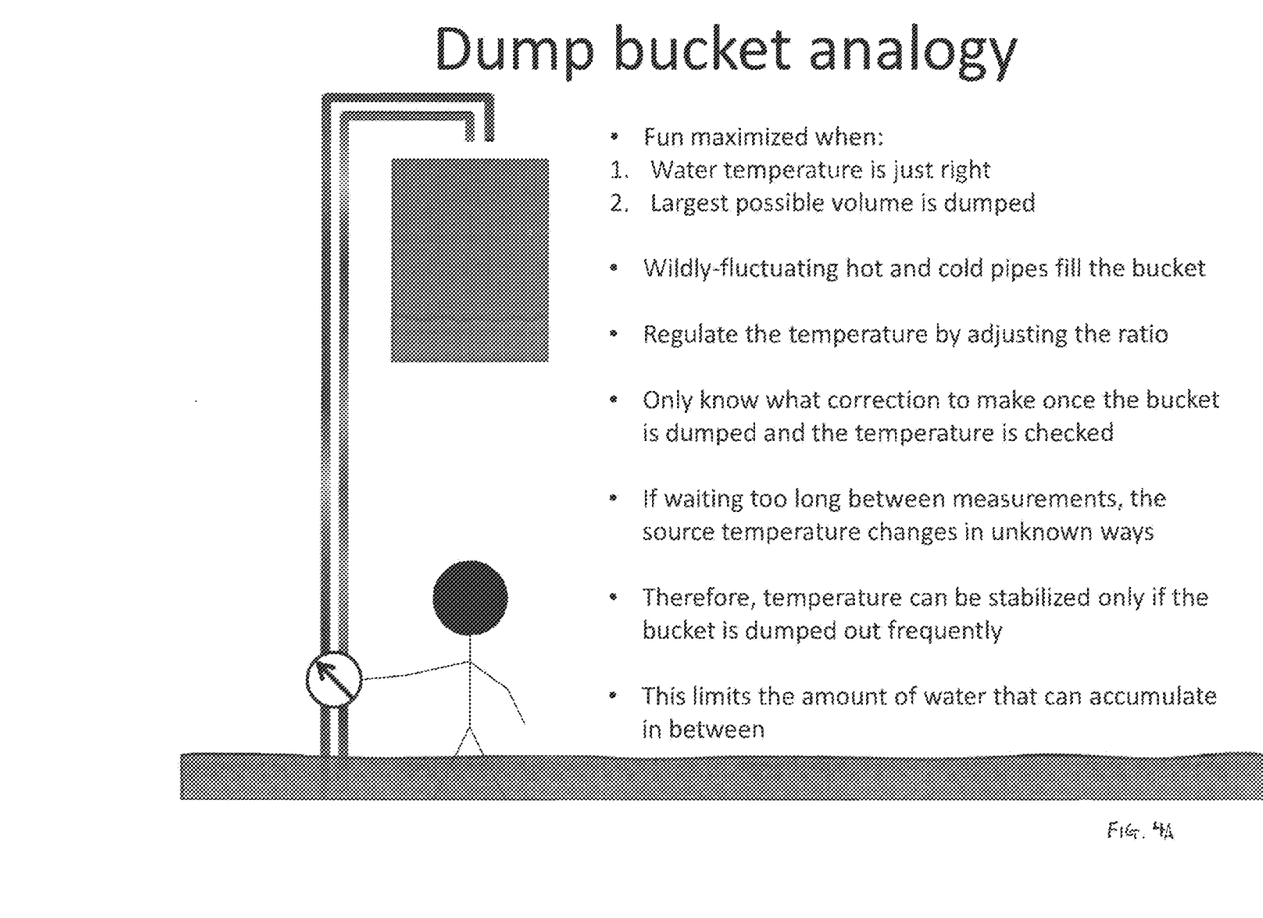
FIG. 4A and FIG. 4B show two versions of an analogy in accordance with the embodiments.
Figure 4B:
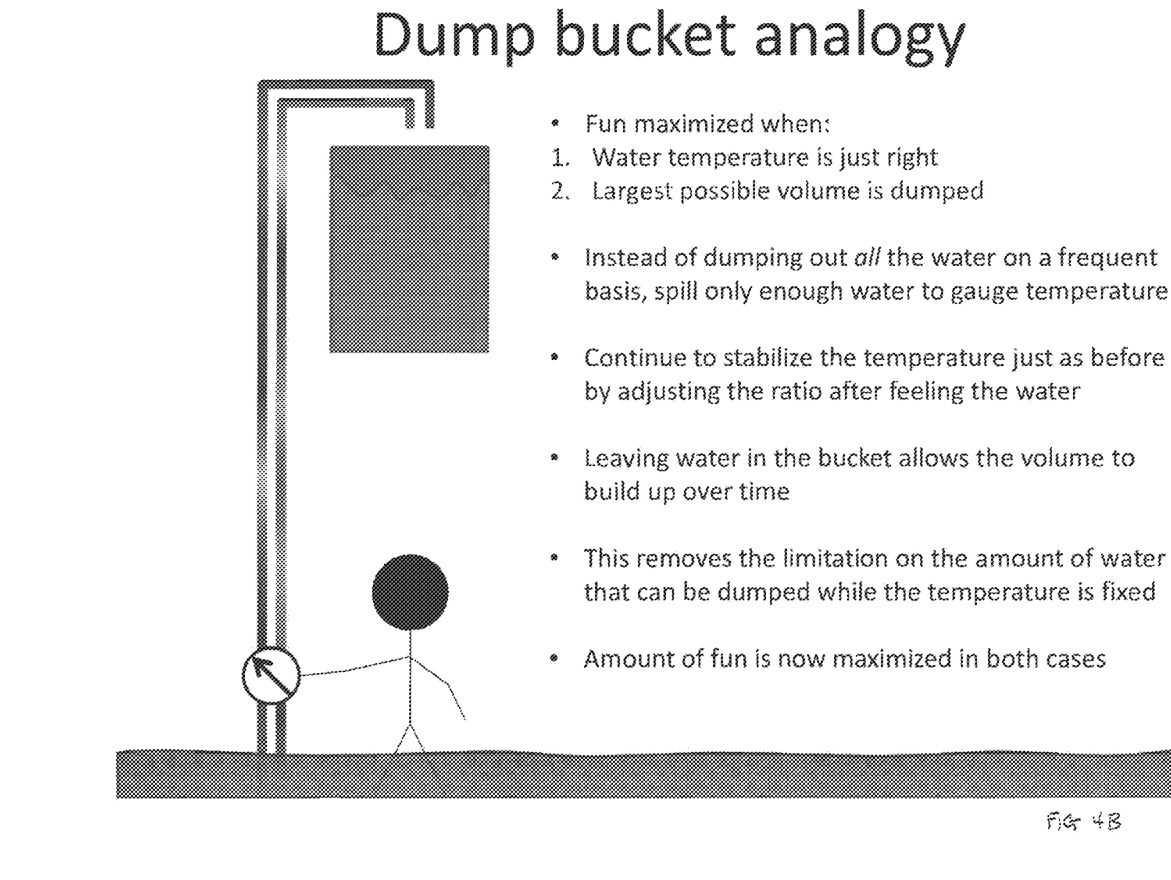

FIG. 4A and FIG. 4B depict a simplified analogy for understand CEP locking of high repetition-rate and low repetition-rate CPA systems in conjunction with the following description. Imagine you are at a water park and you are in charge of controlling the big dump bucket suspended high above the fun pool. There are two things that will maximize your fun: 1) the water temperature needs to be just right (too cold: you turn to ice; too hot: you get burned) and 2) the dump bucket needs to be as full of water as possible.

Unfortunately for you, there are two pipes responsible for filling the bucket: one with hot water whose temperature fluctuates dramatically every few second and one with cold water whose temperature fluctuates dramatically every few second. All you can do is change the ratio of how much cold and how much hot gets mixed into the bucket at any given time while the overall flow rate stays the same.

The bucket is way up in the air, so unfortunately you don't know if your mixture was too hot or two cold until you dump out the bucket and feel the water. Once you have felt it, however, you can tell if it was too hot or too cold, and you can make adjustments with your ratio knob. You soon figure out that your adjustments are only meaningful if the temperature doesn't change faster than you can dump out the bucket and check the water (if you wait too long, the information you gathered from the last bucket becomes less and less important, and your temperature corrections become less reliable).

As a result, you get pretty good at letting the bucket fill up for a few seconds, dumping it out, and adjusting your knob to keep the water right around the perfect temperature. You have a lot of fun with it, but because you're limited to filling up the bucket for only a few seconds, the amount of water you dump out isn't exactly overwhelming. In fact, you're probably only filling up 1% of the bucket or less.

After a while, you get an idea: instead of dumping all the water out every few seconds, you dump only 10% of the water out every few seconds. This still allows you to monitor the water temperature and correct the input ratio as often and as accurately as you did before, but it also allows you to accumulate water in your bucket over a long period of time. As a result, you are able to maximize the amount of fun you have by dumping out far more temperature-controlled water than anyone ever has before.

To complete the analogy: The dump bucket is the laser pulse. The wildly-fluctuating (but controllable) water temperature is the pulse's CEP, and the amount of water in the bucket is equivalent to the laser's pulse energy. Therefore, the amount of fun the park-goer has (two parts: 1) water temperature and 2) water volume) is analogous to the useful of the laser pulse (two parts: 1) CEP stabilization and 2) laser pulse energy). The human park-goer plays the role of the CEP control loop, and the frequency at which he/she dumps out the bucket is analogous to the laser's repetition rate (or, in the 10% partial-pour case, the repetition rate of the 10% probe).

All references, including publications, patent applications, and patents cited herein are hereby incorporated by reference in their entireties to the same extent as if each reference was individually and specifically indicated to be incorporated by reference and were set forth in its entirety herein.

The use of the terms "a" and "an" and "the" and similar referents in the context of describing the embodiment (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it was individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments and does not impose a limitation on the scope of the embodiment unless otherwise claimed.

No language in the specification should be construed as indicating any non-claimed element as essential to the practice of the embodiment.

It will be apparent to those skilled in the art that various modifications and variations can be made to the present embodiments without departing from the spirit and scope of the embodiment. There is no intention to limit the embodiments to the specific form or forms disclosed, but on the contrary, the intention is to cover all modifications, alternative constructions, and equivalents falling within the spirit and scope of the embodiments, as defined in the appended claims. Thus, it is intended that the present embodiments cover the modifications and variations of the embodiments provided they come within the scope of the appended claims and their equivalents.

The invention claimed is:

1. A CPA system, comprising:
   a pulse stretcher that provides stretched optical pulses from a CEP-stabilized oscillator;
   a high repetition rate seed amplifier disposed to receive the stretched optical pulses from the pulse stretcher, which provides a high repetition rate seed beam output;
   a low repetition rate amplifier disposed to directly receive the high repetition rate seed beam output and provide a low repetition rate output beam;
   a pulse compressor disposed to receive the low repetition rate output beam;
   a high repetition rate seed beam sampling component optically coupled with the high repetition rate seed amplifier for selecting a portion of the high repetition rate seed beam output as a sample beam;
   a sample beam optical assembly optically coupled with the high repetition rate seed beam sampling component disposed in a manner to route the sample beam around the low repetition rate amplifier and into the pulse compressor, wherein the sample beam output from the pulse compressor is encoded with CEP errors;
   a measurement device disposed to receive the encoded sample beam output from the pulse compressor;
   a sample beam correction control loop that receives a measurement signal from the measurement device coupled to a CEP stabilization module.

2. A method for controlling carrier envelope phase (CEP) of low repetition rate pulses in a CPA system, comprising:
   providing a CEP-stabilized seed beam;
   propagating the CEP-stabilized seed beam through a pulse stretcher;
   propagating the stretched seed beam through a high repetition rate amplifier;
   propagating the amplified, stretched, high repetition rate beam through a low repetition rate amplifier;
   propagating the amplified, stretched, high repetition rate beam output from the low repetition rate amplifier through a pulse compressor;
   obtaining a sample beam by sampling a portion of the amplified, stretched, high repetition rate beam prior to propagating the amplified, stretched, high repetition rate beam through the low repetition rate amplifier;
   bypassing the low repetition rate amplifier with the sample beam;
   propagating the sample beam through the pulse compressor;
   measuring the compressed sample beam;
   using a parameter of the measured sample beam to stabilize the CEP.

* * * * *